United States Patent
Wilcox et al.

(10) Patent No.: US 6,842,831 B2
(45) Date of Patent: Jan. 11, 2005

(54) LOW LATENCY BUFFER CONTROL SYSTEM AND METHOD

(75) Inventors: Jeffrey R. Wilcox, Folsom, CA (US); Opher D. Kahn, Zichron-Yacov (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 10/133,908

(22) Filed: Apr. 25, 2002

(65) Prior Publication Data

US 2003/0204668 A1 Oct. 30, 2003

(51) Int. Cl.[7] ............................................. G06F 12/00
(52) U.S. Cl. ..................... 711/154; 713/324; 710/39; 710/52; 710/112; 710/118; 710/310; 365/189.5; 365/194; 365/226; 365/227; 365/230.6; 365/230.7
(58) Field of Search ..................... 711/154; 713/324; 710/39, 52, 112, 118, 310, 130; 365/189.5, 194, 226, 227, 230.6, 230.7, 233.5

(56) References Cited

U.S. PATENT DOCUMENTS

| | | | |
|---|---|---|---|
| 5,473,572 A | * 12/1995 | Margeson, III | 365/227 |
| 5,848,022 A | 12/1998 | Jiang | |
| 6,038,673 A | * 3/2000 | Benn et al. | 713/323 |
| 6,073,204 A | * 6/2000 | Lakhani et al. | 711/100 |
| 6,111,812 A | 8/2000 | Gans et al. | |
| 6,233,661 B1 | 5/2001 | Jones et al. | |
| 6,269,433 B1 | 7/2001 | Jones et al. | |
| 6,510,099 B1 | * 1/2003 | Wilcox et al. | 365/230.06 |
| 6,523,089 B2 | * 2/2003 | Tsern et al. | 711/118 |
| 6,535,450 B1 | * 3/2003 | Ryan et al. | 365/230.03 |
| 6,671,815 B2 | * 12/2003 | Iwamura et al. | 713/324 |

OTHER PUBLICATIONS

Micron Semiconductor Product, Inc., "Double Data Rate (DDR) SDRAM," Preliminary Data Sheet, Rev. 2/00.

Cuppu, V., et al., "A Performance Comparison of Contemporary DRAM Architectures", Proceedings of the 26th International Symposium on Computer Architecture, May 2–4, 1999.

Yamauchi, T., et al., "The Hierarchical Multi–Bank DRAM: A High–Performance Architecture for Memory Integrated with Processors," Proceedings of the 19th Conference on Advanced Research in VLSI, Sep. 1997.

Cuppu, V., et al., "High–Performance DRAMs in Workstation Environments", IEEE Transactions On Computers, vol. 50; No. 11, Nov. 2001.

* cited by examiner

Primary Examiner—Donald Sparks
Assistant Examiner—Bao Quoc Truong
(74) Attorney, Agent, or Firm—Blakely, Sokoloff, Taylor & Zafman LLP

(57) ABSTRACT

A memory controller (MC) includes a buffer control circuit (BCC) to enable/disable buffer coupled to a terminated bus. The BCC can detect transactions and speculatively enable the buffers before the transaction is completely decoded. If the transaction is targeted for the terminated bus, the buffers will be ready to drive signals onto the terminated bus by the time the transaction is ready to be performed, thereby eliminating the "enable buffer" delay incurred in some conventional MCs. If the transaction is not targeted for the terminated bus, the BCC disables the buffers to save power. In MCs that queue transactions, the BCC can snoop the queue to find transactions targeted for the terminated bus and begin enabling the buffers before these particular transactions are fully decoded.

15 Claims, 7 Drawing Sheets

US 6,842,831 B2

LOW LATENCY BUFFER CONTROL SYSTEM AND METHOD

FIELD OF THE INVENTION

The present invention relates to electronic circuitry and, more particularly, to buffer circuits for use with memories.

BACKGROUND

Memory controller circuits can be used in a variety of computer systems (e.g., desktop personal computers, notebook computers, personal digital assistants, etc.) to facilitate the computer system's processor in accessing memory chips. These memory chips generally include the main memory of the computer system, which typically includes several dynamic random access memory (DRAM) chips. DRAM chips include, for example, synchronous DRAM (SDRAM), extended data out (EDO) DRAM, Rambus (R)DRAM, DDR (double data rate) and DRAM chips. The memory controller typically includes a memory interface for communicating with one or more of such DRAM chips via a memory bus. The memory controller includes buffers to drive signals onto the memory bus. In addition, the memory controller typically includes a system interface to communicate with system processor(s) via a system bus. The memory controller uses these interfaces to route data between the processor and the DRAM chips using appropriate address, control and data signals.

In some systems, the memory bus is terminated with resistors to a mid-range voltage. As a result, if the output buffers are enabled (i.e., pulling up or pulling down the voltage of the memory bus lines) during idle periods, the buffers dissipate power during the idle periods. This power dissipation is undesirable in many applications.

One method of reducing power dissipation by the buffers during idle periods is to implement the buffers as three-state buffers that present a high impedance to the memory bus when disabled. Once the idle period ends, the buffers are enabled, allowing them to drive signals onto the memory bus. However, driving the voltage levels of the memory bus lines takes a finite amount of time. Thus, such systems typically have a time period between when the buffers are enabled and when the signals on the memory bus are at valid logic levels. This "buffer enable" delay if large enough can undesirably increase latency in accessing the memory in some memory designs.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
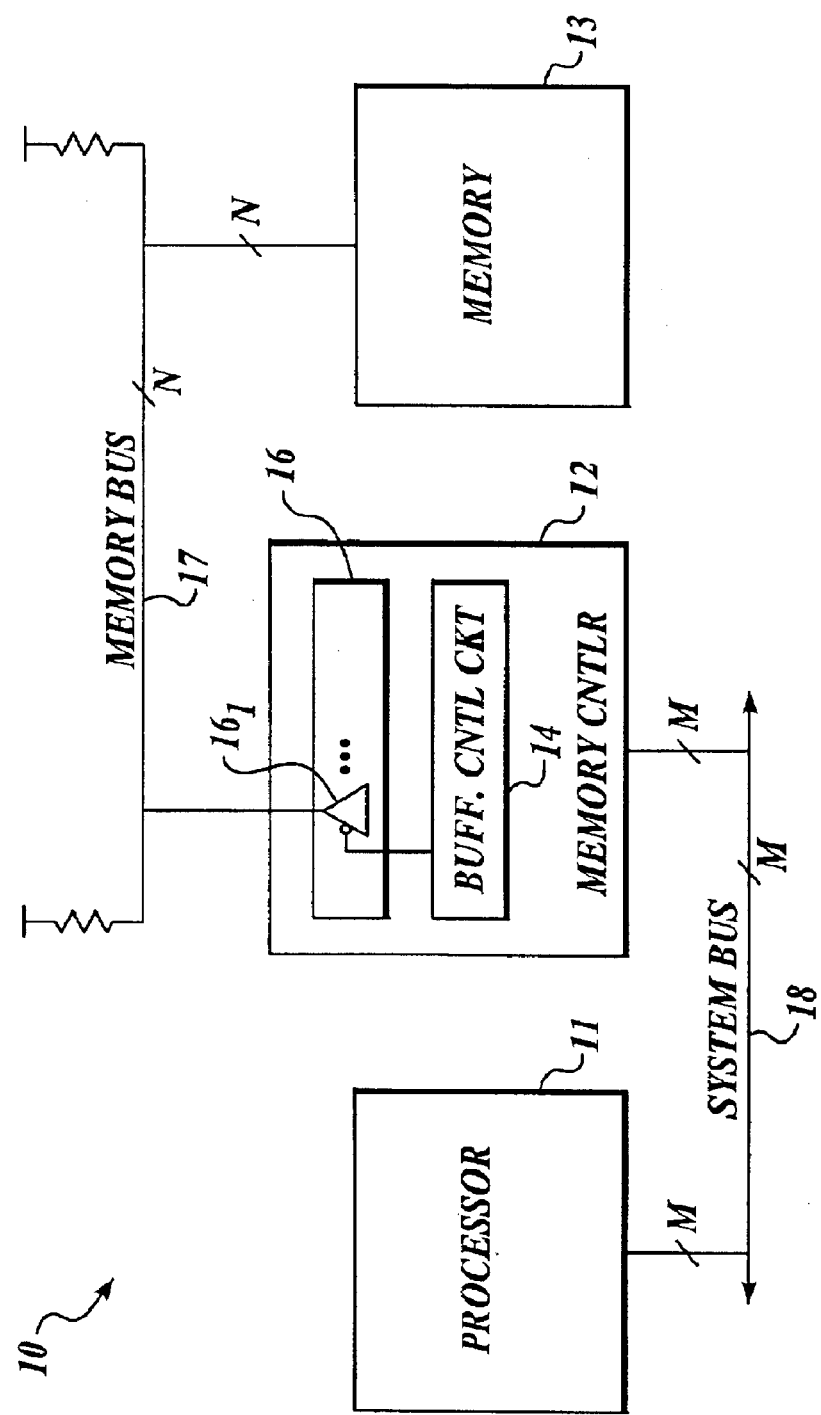
FIG. 1 is a block diagram illustrating a system with memory output buffer control, according to one embodiment of the present invention.

FIG. 1 illustrates a system 10 having low latency buffer control, according to one embodiment of the present invention. In particular, this embodiment of system 10 includes a processor 11, a memory controller 12 and a memory 13. Memory 13 is a DRAM memory in the illustrated embodiment, but can be any type of memory used with a memory bus for which power dissipation is reduced when buffers driving the memory bus are disabled.

In addition, this embodiment of memory controller 12 includes a buffer control circuit 14 and a set of N buffers 16. FIG. 1 shows a buffer $16_1$ of the N buffers, with the remaining buffers being omitted for clarity. Buffer control circuit 14 typically includes circuitry (e.g., combinatorial logic circuits) to provide enable signals to buffers 16, timed to reduce latency in memory accesses.

The elements of this embodiment of system 10 are interconnected as follows. Memory controller 12 is connected to memory 13 and processor 11 via system bus 18 and memory bus 17, respectively. More particularly, buffer 16 of memory controller 12 are connected to memory bus 17. In this embodiment, memory bus 17 has N bus lines, each being resistively terminated to a mid-range voltage, and system bus 18 has M bus lines.

In this embodiment of memory controller 12, buffer control circuit 14 is connected to buffers 16. In particular, buffer control circuit 14 is connected to the enable input terminals of buffers 16. Further, in some embodiments, buffer control circuit 14 is connected to detect transactions being communicated on system bus 18.

Figure 2:
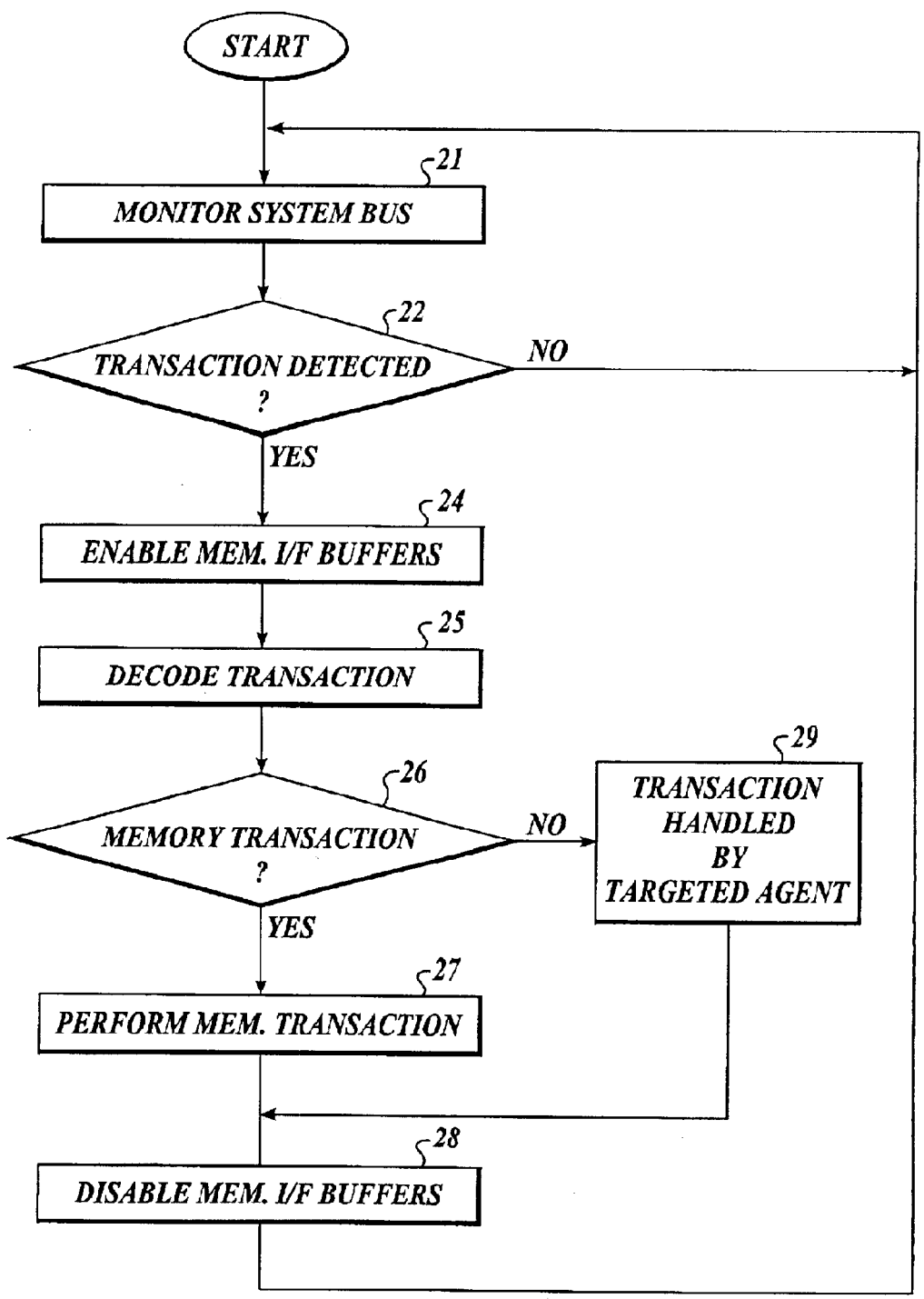
FIG. 2 is a flow diagram illustrating the operation of the system depicted in FIG. 1, according to one embodiment of the present invention.

FIG. 2 illustrates the operational flow of system 10 (FIG. 1) in selectively enabling buffers 16 to reduce latency, according to one embodiment of the present invention. Referring to FIGS. 1 and 2, system 10 operates as follows.

The system bus is monitored for transactions. In one embodiment, memory controller 12 monitors system bus 18 for transactions. More particularly, buffer control circuit 14 of memory controller 12 monitors system bus 18 to detect transactions. This operation is represented by blocks 21 and 22.

If a transaction is detected in block 22, the operational flow proceeds to a block 24; however, if no transaction is detected in block 22, the operational flow returns to block 21.

As shown in block 24, buffers 16 are enabled. In one embodiment, buffer control circuit 14 provides enable signals to the N buffers of buffers 16. In this embodiment, buffers 16 are conventional three-state buffers that present a high impedance to memory bus 17 when disabled, and either pull up or pull down the voltages of the bus lines of memory bus 17 when enabled. Thus, in this embodiment, buffers 16 are enabled before the transaction is decoded; thereby ensuring the buffers are enabled before they are needed to drive signals on memory bus 17. In this way, the latency effects of the aforementioned "buffer enable" delay can be significantly reduced or even eliminated for memory accesses.

The detected transaction is then decoded. In one embodiment, decode circuitry in memory controller 12 decodes the transaction. One function of the decode circuitry is to determine the "target agent" of the transaction. For example, for memory transactions, the targeted agent would be memory 13. Other types of transactions (e.g., PCI transactions), the targeted agent would be a different element (e.g., a PCI card). In one embodiment, the "buffer enable" delay transpires concurrently with the delay of the decode process, which, as described above, reduces or eliminates the impact of the "buffer enable" delay on memory access latency. A block 25 represents this operation.

The decoded transaction is then evaluated to determine whether the transaction is a memory transaction. In one embodiment, buffer control circuit 14 determines whether the transaction is a memory transaction by determining whether the decoded address is within an address range allocated to memory. A block 26 represents this operation.

If the transaction is a memory transaction, memory controller 12 performs the memory transaction as represented by a block 27. Buffers 16 are then disabled. In one embodiment, buffer controller circuit 14 disables the buffers by de-asserting the aforementioned enable signals. A block 28 represents this operation.

However, if in block 26 the transaction is determined to be a non-memory transaction (e.g., a PCI transaction), the transaction is handled by the targeted agent as represented by a block 29. For example, memory controller 12 can ignore the transaction, which will also be received by the targeted agent, thereby allowing the target agent to perform the transaction. The operational flow then returns to block 21, with buffers 16 being disabled.

Figure 3:
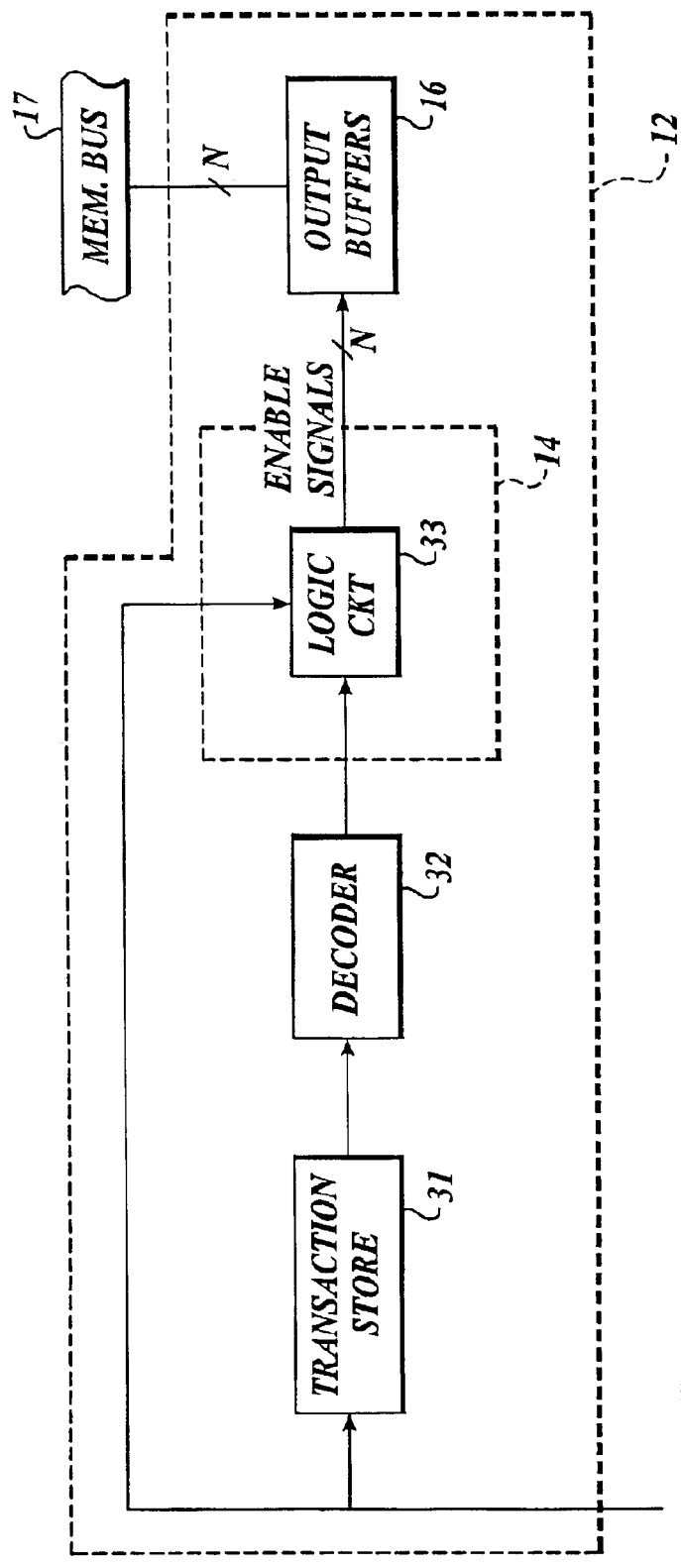
FIG. 3 is a block diagram illustrating a portion of the memory controller depicted in FIG. 1, according to one embodiment of the present invention.

FIG. 3 illustrates a portion of memory controller 12 (FIG. 1), according to one embodiment of the present invention. In this embodiment, memory controller 12 includes a transaction store 31 and a decoder 32. In addition, buffer control circuit 14 (FIG. 1) includes a logic circuit 33.

In this embodiment, transaction store 31 stores transactions received from system bus 18. In one embodiment, transaction store 31 is implemented with a register. Decoder 32 determines, as one of its functions, the targeted agent of a received transaction. In one embodiment, decoder 32 is substantially similar to transaction decoders used in existing memory controllers. In this embodiment, logic circuit 33 includes standard logic gates to generate the enable signals provided to buffers 16 with the desired timing.

Transaction store 31 is connected to receive transactions from system bus 18. Decoder 32 is connected to the output port of transaction store 31. In addition to buffers 16, logic circuit 33 is connected to an output port of decoder 32. Further, in this embodiment, logic circuit 33 is connected to monitor transactions received by transaction store 31. As previously described, buffers 16 have output leads connected to memory bus 17. The operation of this embodiment of memory controller 12 in enabling buffers 16 is described below in conjunction with FIG. 4.

Figure 4:
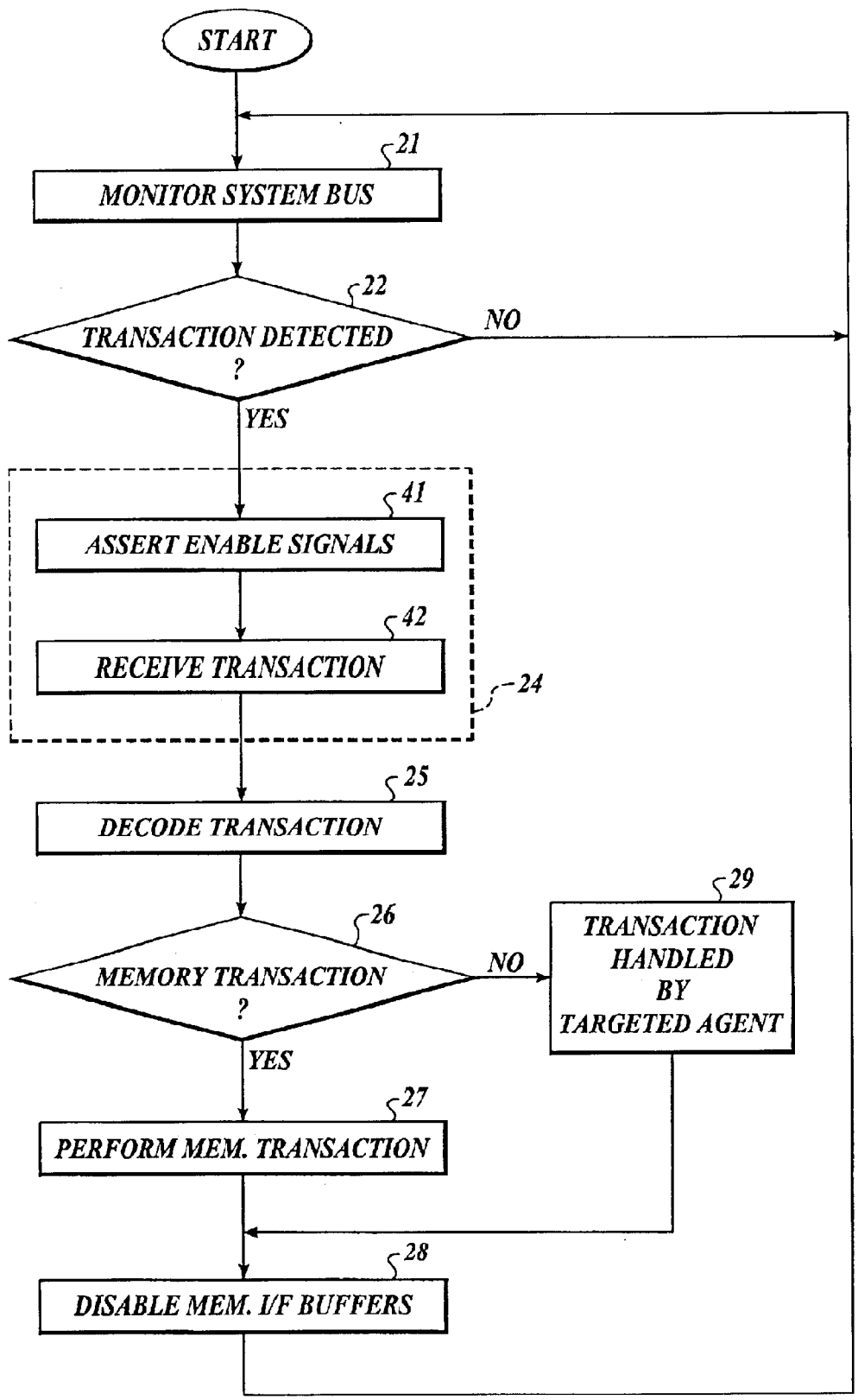
FIG. 4 is a flow diagram illustrating the operation of the memory controller depicted in FIG. 3, according to one embodiment of the present invention.

FIG. 4 illustrates the operational flow of memory controller 12 (FIG. 3) in enabling its memory interface buffers, according to one embodiment of the present invention. Referring to FIGS. 3 and 4, this embodiment of memory controller 12 operates as follows.

This embodiment of memory controller 12 operates in general as described above in conjunction with FIG. 2, with block 24 being described in more detail. Although previously described, blocks 21, 22 and 24–29 are described again to include the interactions with the elements of FIG. 3.

Memory controller 12 performs blocks 21 and 22 to monitor and detect transactions being sent over the system bus. In this embodiment, logic circuit 33 of memory controller 12 monitors system bus 18 to detect transactions.

If logic circuit 33 does not detect a transaction in block 22, the operational flow returns to block 21. However in this embodiment, if logic circuit 33 does detect a transaction, logic circuit 33 asserts enable signals provided to buffers 16. The asserted enable signals enables the buffers as described above for block 24. A block 41 represents this operation.

In addition, the transaction is received by the memory controller. In this embodiment, transaction store 31 receives and stores the transaction. A block 42 represents this operation. Blocks 41 and 42 of this embodiment are operations of block 24 (FIG. 1). Although block 42 is shown in FIG. 4 as being performed after block 41, in practice block 42 may be performed before or concurrently with block 41.

As previously described, because buffers 16 are enabled before the transaction is decoded; the buffers are enabled before they are needed to drive signals on memory bus 17. Thus, the latency effects of the aforementioned "buffer enable" delay can be significantly reduced or even eliminated for memory accesses.

Memory controller 12 then performs block 25 to decode the received transaction. In this embodiment, decoder 32 of memory controller 12 decodes the transaction, which includes determining the "target agent" of the transaction.

Memory controller 12 then performs block 26 to determine whether the transaction is a memory transaction. In this embodiment, decoder 32 determines the targeted agent of the transaction.

If the transaction is a memory transaction, memory controller 12 performs block 27. In one embodiment, memory controller 12 performs the memory transaction using circuitry (not shown) similar to that in existing memory controllers. Then memory controller 12 performs block 28 to disable buffers 16. In this embodiment, logic circuit 33 disables the buffers by de-asserting the aforementioned enable signals.

However, if in block 26 the transaction is not a memory transaction, memory controller 12 performs block 29, allowing the targeted agent to handle the transaction. In one embodiment, memory controller 12 simply ignores the non-memory transaction. The operational flow then proceeds to block 21, with buffers 16 remaining disabled. Although block 28 is shown as being performed after block 29 under these circumstances, in some embodiments block 28 is performed before or concurrently with block 29.

Figure 5:
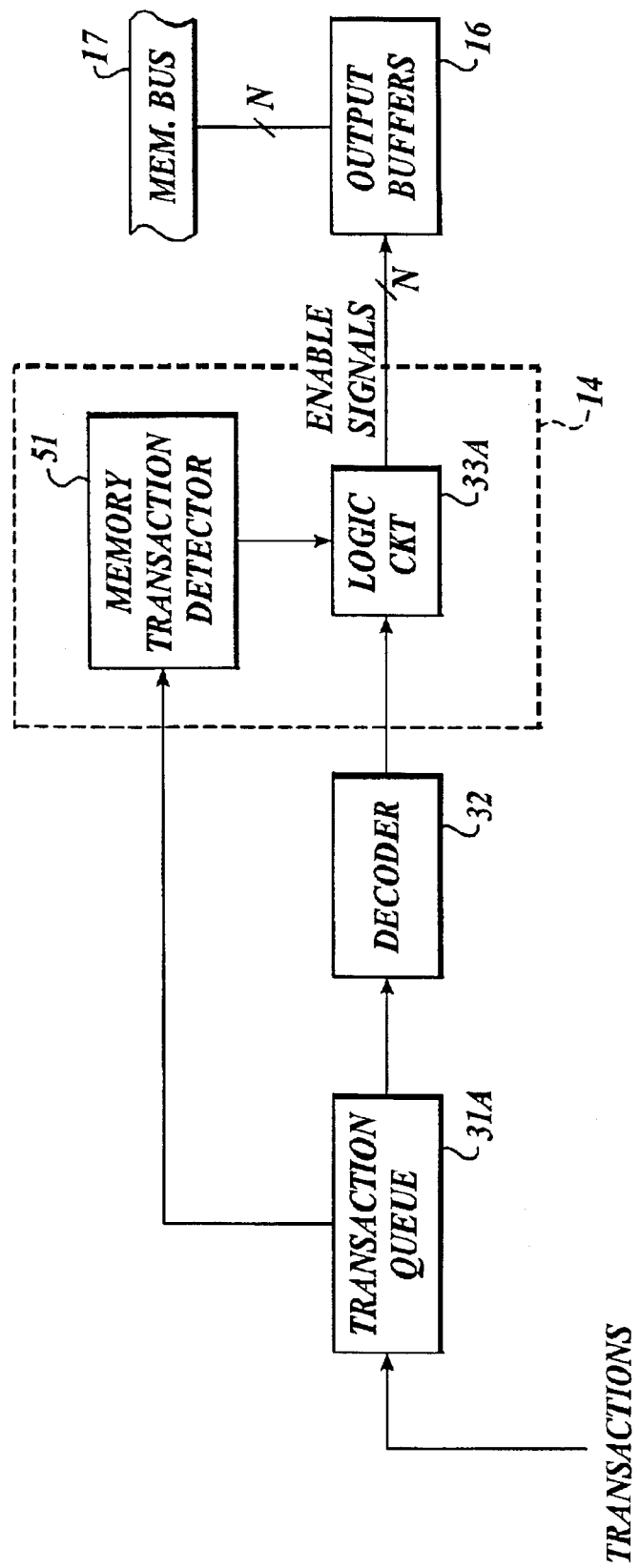
FIG. 5 is a block diagram illustrating a portion of the memory controller depicted in FIG. 1, according to another embodiment of the present invention.

FIG. 5 illustrates a portion of memory controller 12 (FIG. 1), according to another embodiment of the present invention. This embodiment is similar to the embodiment of FIG. 3, except that the transaction store is implemented as a queue or pipeline and the buffer control circuit includes a memory transaction detector connected to monitor transaction via the transaction store instead of directly. More particularly, in this embodiment, memory controller 12 includes a transaction queue 31A and decoder 32. In addition, buffer control circuit 14 (FIG. 1) includes a logic circuit 33A and a memory transaction detector 51. In one embodiment, memory transaction detector 51 is implemented as a decoder configured to decode only the address signals needed determine whether the transaction is a memory transaction.

In this embodiment, transaction queue 31A stores multiple transactions received from system bus 18. In one embodiment, transaction queue 31A is implemented with a FIFO (first in first out) buffer. Decoder 32 operates as described above in conjunction with FIG. 3. Logic circuit 33A is used in generating the enable signals provided to buffers 16, responsive to the output signal of memory transaction detector 51.

Transaction queue 31A is connected to receive transactions from system bus 18. In addition, transaction queue 31A is connected to decoder 32 and to memory transaction detector 51. Memory transaction detector 51 is connected to logic circuit 33A, which in turn is connected to buffers 16. The operation of this embodiment of memory controller 12 in enabling buffers 16 is described below in conjunction with FIG. 6.

Figure 6:
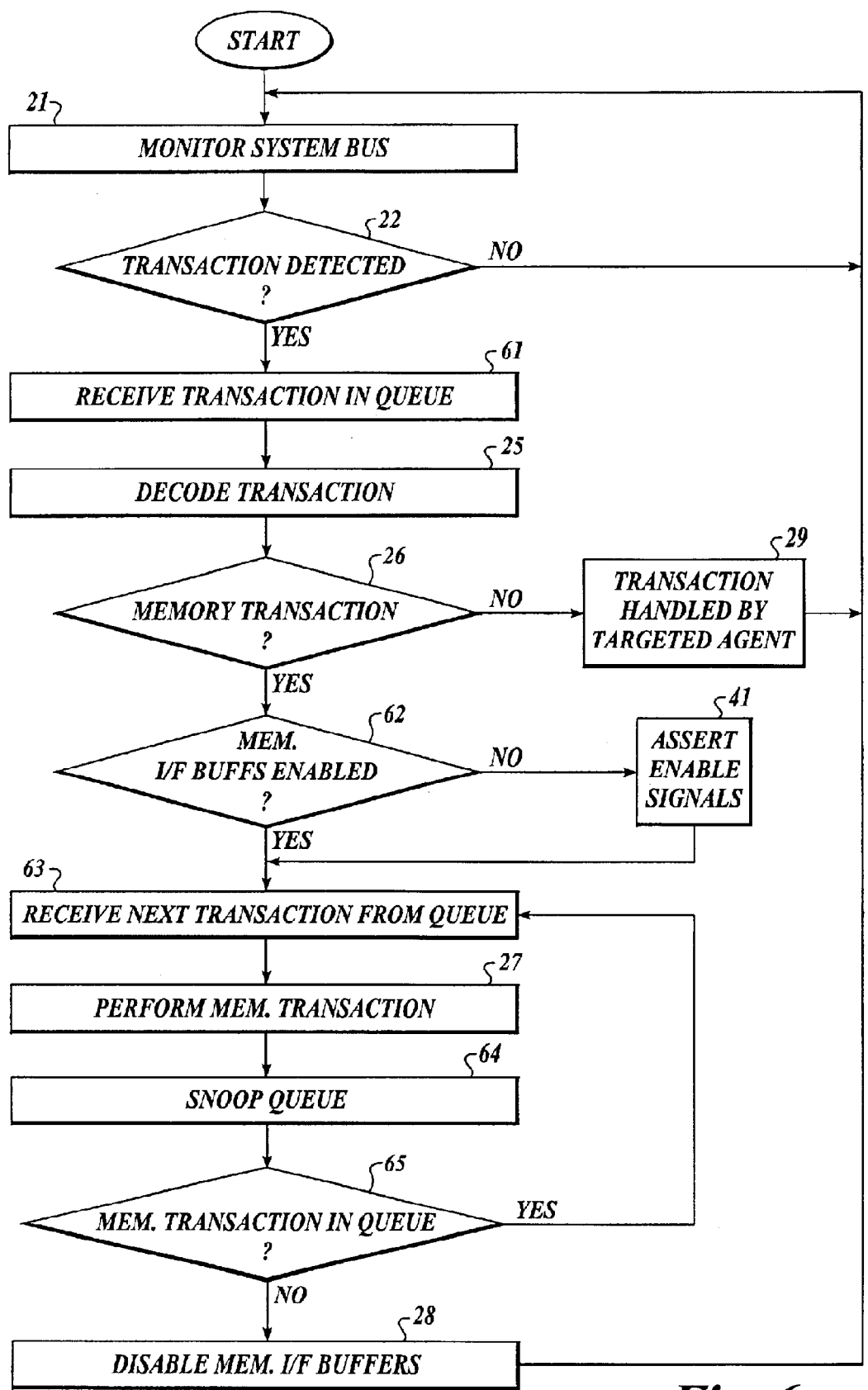
FIG. 6 is a flow diagram illustrating the operation of the memory controller of FIG. 5, according to one embodiment of the present invention.

FIG. 6 illustrates the operation of memory controller 12 (FIG. 5) in enabling its memory interface buffers, according to one embodiment of the present invention. Referring to FIGS. 5 and 6, this embodiment of memory controller 12 operates as follows.

Memory controller 12 performs blocks 21 and 22 to monitor and detect transactions being sent over the system bus. In this embodiment, transaction queue 31A of memory controller 12 monitors system bus 18 to detect transactions.

If transaction queue 31A does not detect a transaction in block 22, the operational flow returns to block 21. However in this embodiment, if transaction queue 31A does detect a transaction, transaction queue 31A receives and stores the transaction. Transaction queue 31A can store more than one transaction. A block 61 represents this operation.

Memory controller 12 then performs block 25 to decode a transaction stored in transaction queue 31A. More particularly, decoder 32 receives the "oldest" transaction stored in the transaction queue and decodes it as previously described.

Memory controller 12 then performs block 26 to determine whether the transaction is a memory transaction. In this embodiment, decoder 32 determines the targeted agent of the transaction. In the transaction is not a memory transaction, memory controller performs block 29 (as described above) and the operational flow returns to block 21.

However, if the transaction is a memory transaction, memory controller 12 determines whether buffers 16 are enabled. In this embodiment, logic circuit 33A determines whether these buffers are enabled. A block 62 represents this operation.

If the buffers are not enabled, memory controller 12 performs block 41 (described above) to enable the buffers. In this embodiment, logic circuit 33A asserts the enable signals to enable buffers 16. In one embodiment, memory controller 12 enables the buffers as previously described in conjunction with FIG. 4 by monitoring transaction queue 31A.

After the buffers are enabled (either after performing block 41 or if the buffers were already enabled as found in block 62), memory controller 12 then receives the memory transaction from transaction queue 31A, as represented by a block 63. In this embodiment, decoder 32 receives the memory transaction from transaction queue 31A. Then memory controller 12 performs block 27 (as described previously) to execute the memory transaction.

Memory controller 12 then checks the contents of transaction queue 31A and determines whether it contains any unexecuted memory transactions. In this embodiment, memory transaction detector 51 checks each transaction stored in transaction queue 31A to determine whether the transaction is a memory transaction. In one embodiment, memory transaction detector 51 provides a signal to logic circuit 33A that indicates whether transaction queue 31A contains a memory transaction. Blocks 64 and 65 represent these operations. In some embodiments, memory transaction detector 51 can be configured to check a subset of the transactions stored in transaction queue 31A rather than all of the transactions. For example, only the next transaction (or some small number of transactions) to be performed is checked in one embodiment. This embodiment may be advantageous for relatively large transaction queues by allowing the buffers to be disabled if the next few transactions in the queue are non-memory transactions.

If transaction queue 31A does not contain a memory transaction, memory controller 12 performs block 28 to disable buffers 16. In this embodiment, logic circuit 33A receives the output signal from memory transaction detector 51 and if the signal indicates that there are no pending memory transaction, logic circuit 33A de-asserts the enable signals.

However, if transaction queue 31A does contain a memory transaction, the operational flow returns to block 63 to receive the next transaction (which need not be a memory transaction) from transaction queue 31A, leaving buffers 16 enabled.

Figure 7:
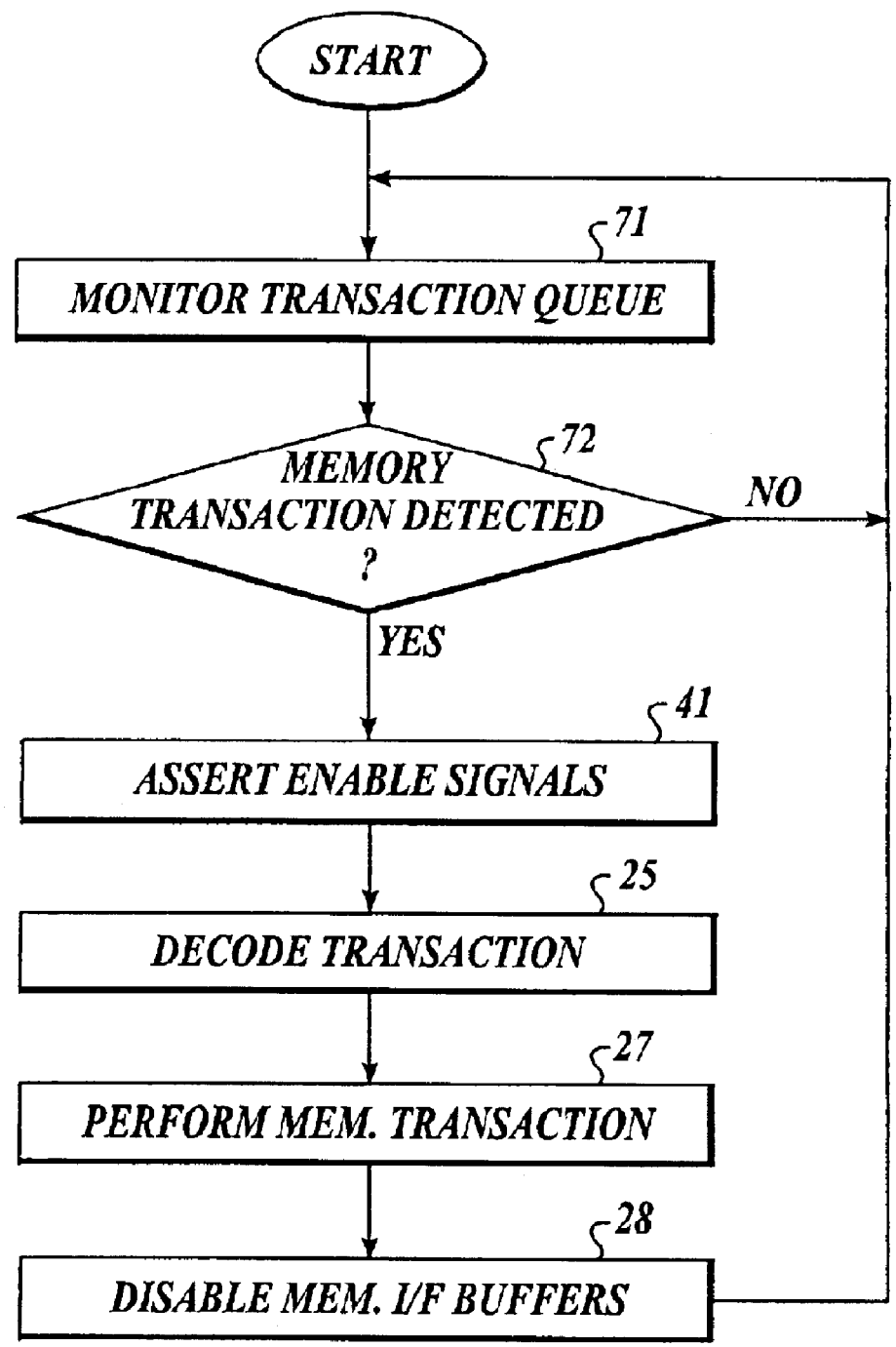
FIG. 7 is a flow diagram illustrating the operation of the memory controller of FIG. 5, according to another embodiment of the present invention.

FIG. 7 illustrates the operation of memory controller 12 (FIG. 5), according to another embodiment of the present invention. Referring to FIGS. 5 and 7, memory controller 12 operates as follows to enable buffers 16.

The transactions received and stored by memory controller 12 are monitored for memory transactions. In one embodiment, memory transaction detector 51 monitors the contents of transaction queue 31A for transactions. A block 71 represents this operation.

The stored transactions are then checked to determine whether any are memory transactions. In one embodiment, memory transaction detector 51 decodes a stored transaction to determine whether it is a memory transaction. For example, memory transaction detector 51 may be configured to determine whether the transaction to be outputted by transaction queue 31A during the next cycle is a memory transaction. A block 72 represents this operation.

If the transaction checked in block 72 is not a memory transaction, the operational flow returns to block 71. However, if the transaction is a memory transaction, block 41 is performed as described above to enable the buffers. In this embodiment, memory transaction detector 51 provides a signal to logic circuit 33A to assert the enable signals provided to buffers 16.

Memory controller 12 then performs block 25 to decode a transaction stored in transaction queue 31A. More particularly, decoder 32 receives the "oldest" transaction stored in the transaction queue and decodes it as previously described.

Memory controller 12 then performs block 26 to determine whether this transaction is a memory transaction. In this embodiment, decoder 32 determines this targeted agent of the transaction to determine whether the transaction is a memory transaction.

If this transaction is a memory transaction, memory controller 12 performs block 27 as previously described to execute the memory transaction and then block 28 to disable buffers 16. In this embodiment, logic circuit 33A de-asserts the enable signals to disable buffers 16. However, if the transaction is not a memory transaction, memory controller 12 performs block 29 as previously described, allowing the targeted agent to perform the transaction.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A circuit for use in a memory controller, comprising:
   a plurality of buffers, couplable to a first bus, to output signals onto the first bus;
   a buffer control circuit coupled to the plurality of buffers, wherein the buffer control circuit is configurable to begin enabling the plurality of buffers to output signals onto the first bus for a transaction before the memory controller provides input signals to the plurality of buffers responsive to the transactioir; and
   a decoder coupled to the buffer control circuit to decode a transaction.
   wherein the buffer control circuit is further configurable to disable the plurality of buffers if the decoded transaction is not a memory transaction.

2. The circuit of claim 1, further comprising a transaction store couplable to a second bus to receive transactions sent over of the second bus.

3. The circuit of claim 2, wherein the transaction store comprises a register.

4. The circuit of claim 2, wherein the transaction store comprises a queue.

5. The circuit of claim 4, wherein the buffer control circuit further comprises a memory transaction detector coupled to the transaction store and the buffer control circuit.

6. The circuit of claim 5, wherein the memory transaction detector comprises a second decoder.

7. The circuit of claim 5, wherein the buffer control circuit is further configurable to disable the plurality of buffers if a memory store does not contain a memory transaction.

8. The circuit of claim 1, wherein the buffer control circuit is further configurable to disable the plurality of buffers after the memory controller performs a memory transaction.

9. A system comprising:
   a processor;
   a memory;
   a memory controller coupled to the processor and the memory, wherein the memory controller includes:
      a plurality of buffers coupled to a terminated memory bus;
      a decoder to decode a transaction sent by the processor; and
      a buffer control circuit, coupled to the decoder and the plurality of buffers, to detect the transaction and, in response thereto, to enable the plurality of buffers before the decoder completes decoding the transaction, wherein the buffer control circuit is configurable to determine whether the transaction is a memory transaction and to disable the plurality of buffers if the transaction is not a memory transaction.

10. The system of claim 9 wherein the memory controller further comprises a transaction store coupled to the decoder.

11. The system of claim 10 wherein the transaction store comprises a queue.

12. A system comprising:
    a processor;
    a memory;
    a memory controller coupled to the processor and the memory, wherein the memory controller includes:
       a plurality of buffers coupled to a memory bus, the memory bus being terminated to a mid-range voltage;
       a transaction store to store transactions sent by the processor;
       a decoder coupled to the transaction store to decode a transaction being output by the transaction store; and
       a buffer control circuit coupled to the transaction store and the plurality of buffers, wherein the buffer control circuit is configurable to disable the plurality of buffers after the transaction is performed if the transaction store does not contain other transactions targeted for the terminated memory bus,
       wherein the buffer control circuit is further configurable to determine whether a decoded transaction from the transaction store is targeted for the memory bus and in response thereto enable the plurality of buffers if they are not already enable.

13. The system of claim 12 wherein the buffer control circuit is further configurable to allow the plurality of buffers to remain enabled after the transaction is performed if the transaction store does contain a transaction targeted for the memory bus.

14. The system of claim 12 wherein the transaction store comprises a queue.

15. The system of claim 12 wherein the buffer control circuit is further configurable to delay performance of the decoded transaction after enabling the plurality of buffers.

* * * * *